United States Patent [19]

Rybicki et al.

[11] 4,326,779
[45] Apr. 27, 1982

[54] 10× MICROSCOPE OBJECTIVE

[75] Inventors: Edward B. Rybicki, Depew; Milton H. Sussman, Amherst, both of N.Y.

[73] Assignee: American Optical Corporation, Southbridge, Mass.

[21] Appl. No.: 144,745

[22] Filed: Apr. 28, 1980

[51] Int. Cl.³ .......................... G02B 21/02; G02B 9/34
[52] U.S. Cl. .................................................... 350/414
[58] Field of Search ........................ 350/414, 472, 469

[56] References Cited

U.S. PATENT DOCUMENTS

| | | | |
|---|---|---|---|
| 3,476,462 | 11/1969 | Banford | 350/414 |
| 3,711,186 | 1/1973 | O'Connor | 350/414 X |
| 3,756,698 | 9/1973 | Nakagawa | 350/414 |
| 3,883,231 | 5/1975 | Koizumi | 350/414 X |

FOREIGN PATENT DOCUMENTS 45-17630  6/1970  Japan ..................... 350/414

OTHER PUBLICATIONS

Anzai, S.; "Micro-Optics for the 80's Chromatic Aberration Free Designs"; *Functional Photography;* vol. 15, No. 1; Jan. 1980; pp. 26-33.

*Primary Examiner*—John K. Corbin
*Assistant Examiner*—Scott J. Sugarman
*Attorney, Agent, or Firm*—Alan H. Spencer

[57] ABSTRACT

A four component 10× microscope objective having a concavo-convex negative triplet as the third element providing sufficient color correction to permit classification as a semi-apochromatic objective is disclosed.

3 Claims, 1 Drawing Figure

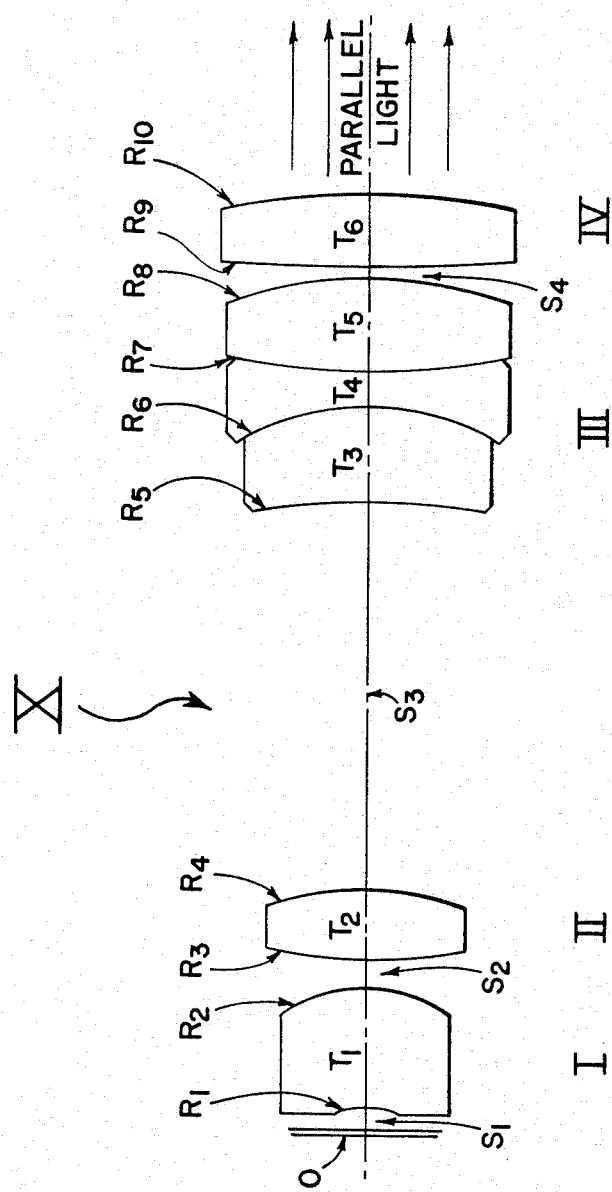

10× MICROSCOPE OBJECTIVE

BACKGROUND OF THE INVENTION

This invention relates to improvements in a microscope objective, and in particular to a semi-apochromatic microscope objective with a numerical aperture of substantially 0.30, and a magnification of substantially 10×. It is the object of this invention to provide such a microscope objective in which the usual chromatic image aberrations are exceptionally well corrected as well as spherical aberration, coma, and astigmatism, while having a substantially flat image over a 20 millimeter field when used with telescope as described in U.S. Pat. No. 3,355,235 and a typical 10× eyepiece.

PRIOR ART

U.S. Pat. No. 3,476,462, issued Nov. 4, 1969, to Benford discloses a 10× objective when used with a field flattening lens. The objective is a semi-objective or a semi-apochromatic objective but represents a conventional apochromatic objective. The third element is a convex-concavo douplet.

the apochromatic aberration, it does not provide full correction.

THE DRAWING AND THE INVENTION

The drawing is an optical diagram of the preferred form of the present invention wherein the numeral X designates the objective in general, and the numerals I, II, III, and IV designate the four optically aligned lenses of the objective. The foremost lens I is a concavo-convex positive singlet. Rearward of I is lens II, a biconvex positive singlet, followed by lens III, a concavo-convex negative triplet. The rearmost lens IV is a biconvex positive singlet.

THE DESCRIPTION

With respect to the lens parameters, the axial thicknesses of successive lens elements are designated $T_1$ to $T_6$ and the successive axial spaces from the object plane (designated O) are $S_1$ to $S_4$. The successive lens radii are designated $R_1$ to $R_{10}$ where the minus sign (—) applies to surfaces whose center of curvature lies on the object side of their vertices. The refractive indices and Abbe numbers of the glasses in the successive lenses are designated ND(1) to ND(6), and V(1) to V(6) respectively.

TABLE I

| Lens | Radius (R) | Thickness (T) | Space (S) | Refractive Index (ND) | Abbe Number ($\nu$) |
|---|---|---|---|---|---|
|  |  |  | $S_1 = 0.06\ f$ |  |  |
| I | $R_1 = -0.155\ f$ | $T_1 = 0.274\ f$ |  | $1.75 < ND_1 < 1.80$ | $36.5 < \nu_1 < 37.5$ |
|  | $R_2 = -0.314\ f$ |  | $S_2 = 0.03\ f$ |  |  |
| II | $R_3 - 1.000\ f$ | $T_2 = 0.159\ f$ |  | $1.40 < ND_2 < 1.45$ | $95.0 < \nu_2 < 96.0$ |
|  | $R_4 = -0.871\ f$ |  | $S_3 = 0.94\ f$ |  |  |
|  | $R_5 = -1.363\ f$ | $T_3 = 0.219\ f$ |  | $1.40 < ND_3 < 1.45$ | $95.0 < \nu_3 < 96.0$ |
|  | $R_6 = -0.570\ f$ | $T_4 = 0.082\ f$ |  | $1.58 < ND_4 < 1.63$ | $43.7 < \nu_4 < 44.7$ |
| III | $R_7 = 2.024\ f$ | $T_5 = 0.219\ f$ |  | $1.40 < ND_5 < 1.45$ | $95.0 < \nu_5 < 96.0$ |
|  | $R_8 = -0.909\ f$ |  | $S_4 = 0.27\ f$ |  |  |
|  | $R_9 = 5.124\ f$ |  |  |  |  |
| IV |  | $T_6 = 0.164\ f$ |  | $1.53\ \ ND_6 < 1.58$ | $60.3 < \nu_6 < 61.3$ |
|  | $R_{10} = -1.698\ f$ |  |  |  |  |

U.S. Pat. No. 3,711,186, issued Jan. 16, 1973, to O'Connor discloses an apochromatic microscope objective of relatively high power. The patent teaches the use of fluorite glasses and numerous (4) douplets to obtain the necessary color correction to be considered an apochromatic element.

This patent teaches that the use of anomalous glasses and triplets and/or closely spaced douplets are conventional for correcting apochromatic aberration. Apochromatic aberration free designs are the subject of an article by Dr. Satoru Anzai of Nippon Kogaku K. K.; *Functional Photography,* January 1980, Vol. 15, No. 1. The article discusses numerous lens designs but does not suggest a single triplet as an intermediate component of a low magnification for component objective.

U.S. Pat. No. 3,883,231, issued May 13, 1975, to Koizumi discloses a teaching of low magnification objective having four components with the second and fourth component having the necessary color correction. The second component is a biconcavo negative douplet and the fourth component is a concavo-convex positive triplet, while the second component corrects wherein f is the focal length of objective x and about 16 to 20 mm. Indices of refraction and Abbe numbers are absolute values.

Numerically stated, the constructional data for one successful form of the invention where f is 18.267 is given in the following table.

TABLE II

| Lens | Radius (R) | Thickness (T) | Space (S) | Refractive Index (ND) | Abbe Number ($\nu$) |
|---|---|---|---|---|---|
|  |  |  | $S_1 = 1.1$ |  |  |
| I | $R_1 = -2.835$ | $T_1 = 5.0$ |  | $ND_1 = 1.782$ | $\nu_1 = 37.08$ |
|  | $R_2 = -5.743$ |  | $S_2 = 0.57$ |  |  |
| II | $R_3 = 18.28$ | $T_2 = 2.9$ |  | $ND_2 = 1.434$ | $\nu_2 = 95.58$ |
|  | $R_4 = -15.91$ |  | $S_3 = 17.12$ |  |  |
|  | $R_5 = -24.89$ | $T_3 = 4.0$ |  | $ND_3 = 1.434$ | $\nu_3 = 95.58$ |
| III | $R_6 = -10.41$ | $T_4 = 1.5$ |  | $ND_4 = 1.613$ | $\nu_4 = 44.29$ |

TABLE II-continued

| Lens | Radius (R) | Thickness (T) | Space (S) | Refractive Index (ND) | Abbe Number ($v$) |
|---|---|---|---|---|---|
|  | $R_7 = 36.968$ |  |  |  |  |
|  |  | $T_5 = 4.0$ |  | $ND_5 = 1.434$ | $v_5 = 95.58$ |
|  | $R_8 = -16.612$ |  |  |  |  |
|  |  |  | $S_4 = 0.5$ |  |  |
|  | $R_9 = 93.591$ |  |  |  |  |
| IV |  | $T_6 = 3.0$ |  | $ND_6 = 1.564$ | $v_6 = 60.80$ |
|  | $R_{10} = -31.01$ |  |  |  |  |

What is claimed is:

1. A four component, semi-apochromatic, low power microscope objective having an NA of about 0.3 which comprises, aligned on an optical axis, a concavo-convex negative singlet I, a biconvex positive singlet II, a concavo-convex negative triplet III consisting of a concavo convex first element having an Abbe number of at least 95, a biconcavo second element and a biconvex third element having the same dispersion value as the first element of the triplet and a biconvex positive singlet IV.

2. The objective of claim 1 wherein the parameters of components I, II, III, and IV are as follows:

| Lens | Radius (R) | Thickness (T) | Space (S) | Refractive Index (ND) | Abbe Number ($v$) |
|---|---|---|---|---|---|
|  |  |  | $S_1 = 0.06\ f$ |  |  |
|  | $R_1 = -0.155\ f$ |  |  |  |  |
| I |  | $T_1 = 0.274\ f$ |  | $1.75 < ND_1 < 1.80$ | $36.5 < v_1 < 37.5$ |
|  | $R_2 = -0.314\ f$ |  |  |  |  |
|  |  |  | $S_2 = 0.03\ f$ |  |  |
|  | $R_3 = 1.000\ f$ |  |  |  |  |
| II |  | $T_2 = 0.159\ f$ |  | $1.40 < ND_2 < 1.45$ | $95.0 < v_2 < 96.0$ |
|  | $R_4 = -0.871\ f$ |  |  |  |  |
|  |  |  | $S_3 = 0.94\ f$ |  |  |
|  | $R_5 = -1.363\ f$ |  |  |  |  |
|  |  | $T_3 = 0.219\ f$ |  | $1.40 < ND_3 < 1.45$ | $95.0 < v_3 < 96.0$ |
|  | $R_6 = -0.570\ f$ |  |  |  |  |
| III |  | $T_4 = 0.082\ f$ |  | $1.58 < ND_4 < 1.63$ | $43.7 < v_4 < 44.7$ |
|  | $R_7 = 2.024\ f$ |  |  |  |  |
|  |  | $T_5 = 0.219\ f$ |  | $1.40 < ND_5 < 1.45$ | $95.0 < v_5 < 96.0$ |
|  | $R_8 = -0.909\ f$ |  |  |  |  |
|  |  |  | $S_4 = 0.27\ f$ |  |  |
|  | $R_9 = 5.124\ f$ |  |  |  |  |
| IV |  | $T_6 = 0.164\ f$ |  | $1.53\ ND_6 < 1.58$ | $60.3 < v_6 < 61.$ |
|  | $R_{10} = -1.698\ f$ |  |  |  |  | wherein f is the focal length of objective x and about 16 to 20 mm. and indices of refraction and Abbe numbers are absolute values.

3. The objective of claim 2 wherein f is 18.267 mm., $ND_2$, $ND_3$ and $ND_5$ are 1.434, $ND_1$ is 1.782, $ND_4$ is 1.613, $ND_6$ is 1.564, $v_2$, $v_3$ and $v_5$ are 95.58, $v_1$ is 37.08, $v_4$ is 44.29 and $v_6$ is 60.80.

* * * * *